United States Patent
Gillemot et al.

[15] 3,676,836
[45] July 11, 1972

[54] UNIVERSAL SHEATH BOND FOR COMMUNICATIONS CABLE

[72] Inventors: George W. Gillemot, 2615 Naple, Venice, Calif. 90291; John T. Thompson, 19201 Wells Drive, Tarzana, Calif. 91356

[22] Filed: Oct. 1, 1970

[21] Appl. No.: 77,371

Related U.S. Application Data

[63] Continuation of Ser. No. 765,158, Oct. 4, 1968, abandoned.

[52] U.S. Cl................................339/97 R, 339/251, 339/266 G
[51] Int. Cl...............................................................H01r 7/18
[58] Field of Search................339/14, 95, 97, 143, 177, 251, 339/263, 264, 266; 174/38, 51, 71, 88

[56] References Cited

UNITED STATES PATENTS

| | | | |
|---|---|---|---|
| 3,499,972 | 3/1970 | Smith | 174/88 |
| 1,748,536 | 2/1930 | Borden | 339/251 |
| 3,253,247 | 5/1966 | Vos | 339/95 R |
| 3,435,126 | 3/1969 | Hamilton | 339/95 R |
| 3,194,877 | 7/1965 | Collier | 339/97 C |

FOREIGN PATENTS OR APPLICATIONS

| | | | |
|---|---|---|---|
| 1,227,967 | 11/1966 | Germany | 339/251 |

*Primary Examiner*—Joseph H. McGlynn
*Attorney*—Sellers & Brace

[57] ABSTRACT

A universal attachment for bonding all sizes of shielded cables comprising a wedge-shaped shoe adapted to be inserted under the shielding of the cable, the shoe supporting a threaded post, and an anchor plate adapted to be positioned over the post whereupon a locking nut tightly secures substantial areas of the cable sheath and the shielding compressed between the shoe and anchor plate. The threaded post permits bonding of the shielding of the cable to that of other cables by means of an elongated strip of metal having holes therein adapted to fit over the post and be locked in place with a second locking nut. An extension on the anchor plate permits the ready grounding of the shielding.

57 Claims, 14 Drawing Figures

Patented July 11, 1972
3,676,836
4 Sheets-Sheet 1
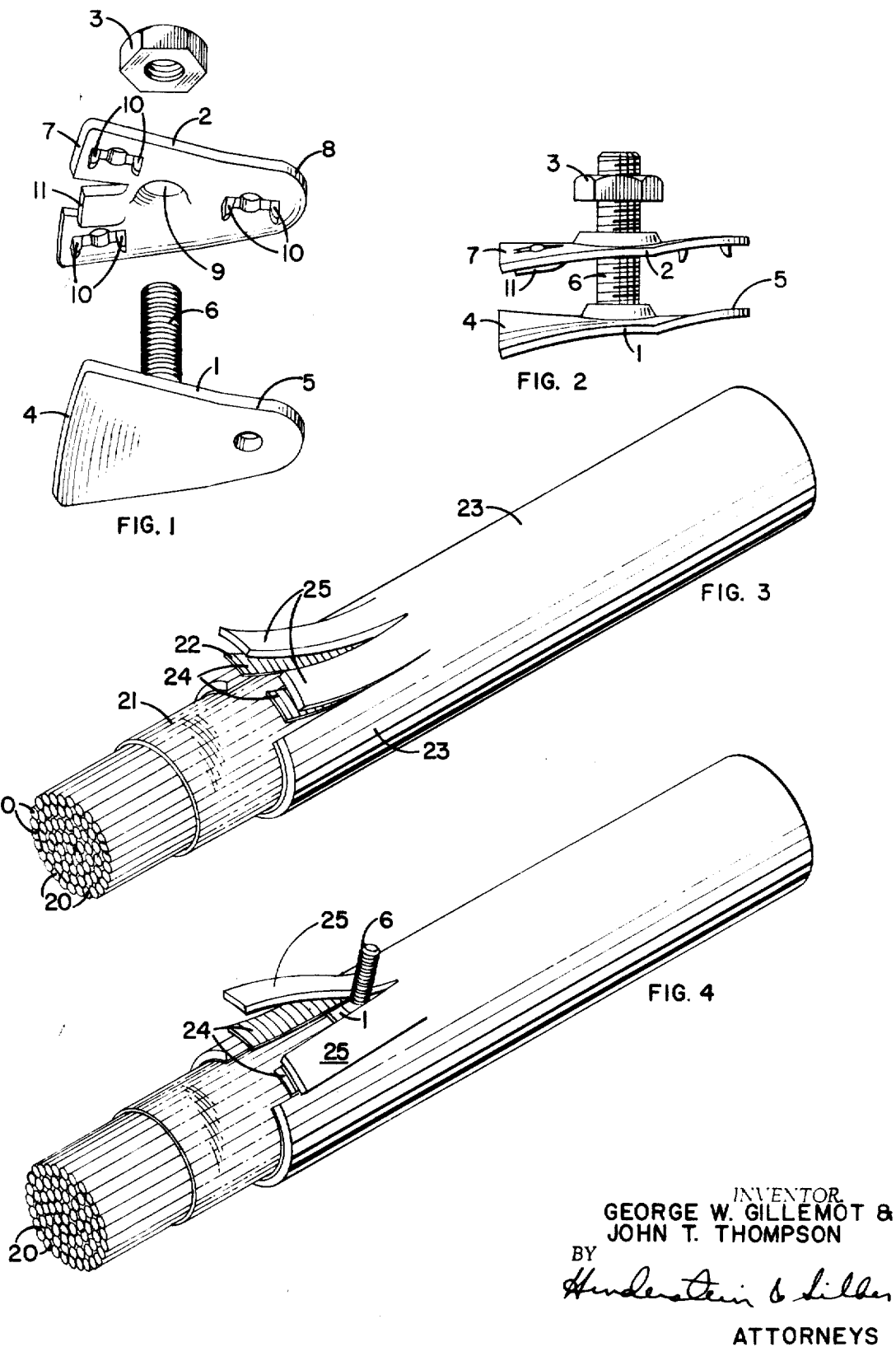
INVENTOR.
GEORGE W. GILLEMOT &
JOHN T. THOMPSON
BY
Henderson & Siller
ATTORNEYS Patented July 11, 1972

INVENTOR.
GEORGE W. GILLEMOT &
JOHN T. THOMPSON
BY
Hinderstein & Silber
ATTORNEYS INVENTOR.
GEORGE W. GILLEMOT &
JOHN T. THOMPSON
BY Hinderstein & Silber
ATTORNEYS

UNIVERSAL SHEATH BOND FOR COMMUNICATIONS CABLE

This application is a continuation of Ser. No. 765,158, filed Oct. 4, 1968, and now abandoned.

BACKGROUND OF THE INVENTION

1. Field of the Invention

The present invention relates to universal attachments for bonding shielded cables and, more particularly, to a method and means for providing electrical continuity and a mechanical anchor between the shielding of a plurality of cables at splices and the like.

2. Description of the Prior Art

Many types of cables, such as telephone and electrical cables, include, in addition to a plurality of filaments and a plastic sheath surrounding the filament bundle, some type of metal shielding between the filaments and the plastic sheath. Such metal shielding, which is usually made of aluminum, generally surrounds the filament bundle running the entire length thereof. This shielding performs several functions. In the first instance, the shielding is generally grounded so that it operates to drain off any induced currents which may be generated by the electrical signals in the several filaments. In addition, the shielding provides a large measure of protection in the presence of external electrical signals. For example, in the case of telephone cables, if a power line or other electrical current carrying device were to come in contact with the telephone cable, the shielding would be operative to conduct the external electrical current to ground, thereby preventing short circuiting of the filament bundle.

It is often required that such shielded, multi-filament cables be spliced at the time of installation or for repair or modification purposes after they have been placed in service. When making such splices, it is necessary to bond the shielding across the splice to provide ground continuity from one cable of the splice to the others. In addition to providing electrical continuity, the bonding means should have substantial strength so that it may act as a mechanical anchor to prevent the several cables at the splice junction from being pulled apart.

The most commonly used device for providing such shield bonding consists of an open ring, the opposite ends of which are flared outwardly. These rings are placed around the aluminum shielding and a clamping member is used to tightly adhere the ring to the shielding to insure good electrical continuity. However, although such a technique is operative to provide a shield bond, many problems are associated therewith. First of all, after the rings are attached to the multiple cables, a problem still exists as to the manner of interconnecting in many ways such as by connecting a wire from one ring to another. However, this is not only inconvenient because of the problems associated with connecting the wire to the ring and clamp but because the wire provides no mechanical strength to the bond.

An additional problem arises from the fact that a wide variety of cable sizes and shapes must be spliced and, therefore, the operator in the field must always have with him a wide vareity of rings, each of a different size. Furthermore, since, as a practical matter, the rings come in a limited number of sizes, the rings never fit exactly correctly.

A still further problem arises in attempting to ground the shielding of the cables in pedestals and other types of terminals. As was the case with the connection between the rings and clamps of multiple cables, there is no simple and efficient manner of connecting the cable shielding or the rings and clamps connected thereto to a ground terminal.

It is, therefore, clear that what is required is a universal attachment for bonding all sizes of shielded cables. The bonding attachment must be highly effective, both as a means for providing electrical continuity with the mechanically weak shield, and as a mechanical anchor to the cable sheath. The bonding attachment must be easy to use and must provide an effective electrical bond and a strong mechanical anchorage to both the shielding jacket and sheath without risk of damage to the shielding or the cable sheath. For universal use, the bonding attachment must be readily adaptable for bonding two, three or more cables, plus all entering services wires. Furthermore, the attachment must permit the ready bonding of in-line splices as well as butt-end splices.

SUMMARY OF THE INVENTION

According to the present invention, the disadvantages of the prior art have been overcome by providing such a universal attachment for bonding all sizes of shielded cables. The present bonding attachment is the ultimate in speed and simplicity of operation and provides both electrical continuity and a degree of mechanical strength which is equal to that provided by the aforementioned ring and clamp. The present bonding attachment is truly universal in that it can be readily used for bonding any number of cables, plus all entering services wires, as well as for grounding the cable shielding.

More specifically, the present invention consists of a bonding clip which comprises a wedge-shaped shield contact shoe which supports a threaded post which extends from the shoe in a substantially perpendicular direction. By making three cuts of the plastic sheath and metal shield, the shoe may be forced between the two tabs so created, between the shield and the filament bundle, whereupon standard electrical tape may be used to securely position the shoe. The bonding clip further comprises an anchor plate having a shape which is substantially the same as the shield contact shoe and which has a hole therein through which the threaded post is adapted to extend. A locking nut is adapted to be placed on the post and tightened whereby the shield contact shoe and anchor plate are drawn together, thereby securing the metal shielding therebetween and providing good electrical continuity between the shielding and the shoe.

After the shield contact shoe and anchor plate are firmly secured, the threaded post provides an efficient means for interconnecting several cables. More specifically, a flat, elongated, metallic strip or bonding bar having a plurality of holes therein of a diameter slightly greater than the diameter of the threaded post, may be positioned to make excellent electrical contact with the post by placing the post through one of the holes and placing another nut on the post and tightening until the bonding bar is firmly secured between the latter nut and the anchor plate locking nut. Finally, bonding of the first shield with the shield of a second cable is accomplished by securing a similar post to the second cable and by connecting the bonding bar to this post in the same manner as described above.

According to another embodiment of the present invention, the anchor plate may be modified to include a hook bearing extension at the narrow end thereof. With such an extension, a clamp positioned around the cable, over the anchor plate, is held in position between the hook and the post extending through the anchor plate. By further positioning a ground terminal between the clamp and the cable, grounding of the cable shielding may be achieved.

It is, therefore, an object of the present invention to provide a universal attachment for bonding shielded cables.

It is a further object of the present invention to provide a method and means for providing electrical continuity between the shielding of multiple cables.

It is a still further object of the present invention to provide such a method and means which further provides a mechanical anchor between the cables.

It is another object of the present invention to provide a universal attachment for bonding shielded cables which may be installed simply and speedily.

It is still another object of the present invention to provide a universal attachment for bonding shielded cables which may be used with all sizes of cables.

Another object of the present invention is the provision of a universal attachment for bonding shielded cables which may also be used for grounding such cables.

Still other objects, features and attendant advantages of the present invention will become more apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWINGS

FIG. 1 is an enlarged, perspective view of the present bonding clip showing the relationship between the shield contact shoe, the anchor plate, and the anchor plate locking nut;

FIG. 2 is a side elevation view of the bonding clip of FIG. 1 showing the manner in which the three parts mate;

FIG. 3 is a perspective view of a typical communications cable showing the relative positioning of the filament bundle, the metal shielding and the plastic sheath and also showing the manner in which these parts are modified to accept the present bonding clip;

FIG. 4 shows the communications cable of FIG. 3 with the shield contact shoe in place;

DESCRIPTION OF THE PREFERRED EMBODIMENTS

Figure 5:
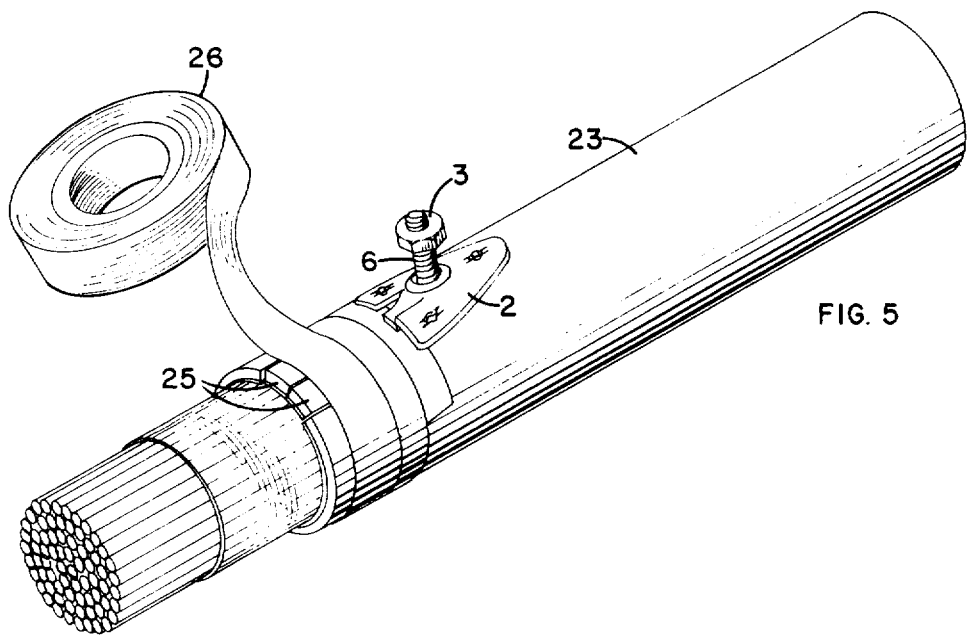
FIG. 5 shows the communications cable of FIG. 3 with the completed bonding clip assembly.

Referring now to the drawings and, more particularly, to FIGS. 1 and 2 thereof, there is shown the details of the present universal attachment for bonding shielded communications cables. The attachment consists of a bonding clip which comprises a shield contact shoe 1, an anchor plate 2, and a locking nut 3. Shield contact shoe 1 is a generally wedge-shaped member whose wide end 4 has a slight curvature to approximate the curvature encountered in the shielding of typical sizes of communications cable. The narrow end 5 of shield contact shoe 1 is flared upwardly at a slight angle from the remainder of shoe 1 for reasons which will become more apparent hereinafter.

Shield contact shoe 1 supports a threaded post 6 which extends from the approximate center thereof in a substantially perpendicular direction. Threaded post 6 may be secured to shield contact shoe 1 in any convenient manner. For example, shield contact shoe 1 may have a hole drilled in the approximate center thereof and threaded post 6 may be a simple flathead screw which extends through the hole in shoe 1 and which is welded or soldered in position.

Anchor plate 2 is also a generally wedge-shaped member whose shape is substantially the same as that of shield contact shoe 1. The wide end 7 of anchor plate 2 has approximately the same width and has approximately the same curvature as end 4 of shield contact shoe 1. Similarly, the narrow end 8 of anchor plate 2 is flared upwardly at approximately the same angle as end 5 of shoe 1. Anchor plate 2 has a hole in the approximate center thereof, the diameter of which is slightly greater than the diameter of threaded post 6 so that post 6 may be readily inserted therein. As shown in FIG. 2, hole 9 in plate 2 is located so that when plate 2 is positioned over post 6, anchor plate 2 is substantially aligned with shield contact shoe 1.

Referring again to FIG. 1, anchor plate 2 is provided with a plurality of teeth 10 which extend from the bottom side thereof. Most simply, teeth 10 are cut directly into plate 2 and are bent downwardly in a manner which will appear obvious to those skilled in the art from an inspection of FIG. 1. Furthermore, a tab 11 may be cut in end 7 of anchor plate 2 and extended downwardly as shown in FIG. 1. The purpose of teeth 10 and tab 11 will become clearer hereinafter.

The internal threads of locking nut 3 are such as to mate with the threads of post 6.

Referring now to FIG. 3, many types of cables, such as telephone and electrical cables, include a plurality of filaments 20 which may or may not be wrapped in a binder material 21. Typically, binder 21 is made of Mylar or the like. A metal shield 22 is wrapped around binder 21 and extends the entire length of the cable. Finally, a plastic sheath 23 surrounds shielding 22 and forms the outer surface of the cable. When splicing such cables, it is necessary to bond shielding 22 across the splice to provide electrical continuity from one cable of the splice to the others. This is the function provided by the present bonding clip and the procedure for use thereof is as follows.

Referring to FIGS. 3, 4 and 5, three cuts are made in sheath 23 and shielding 22 so as to form a pair of tabs 24 in shielding 22 and a similar pair of tabs 25 in sheath 23. Binder 21 should not be cut. After this is done, shield contact shoe 1 is forced between tabs 24 and 25 as shown in FIG. 4. Shield contact shoe 1 is wedge-shaped so that narrow end 5 thereof may be readily forced into the space between tabs 24 and 25. The slight upward angle of end 5 of shoe 1 further assists in wedging shield contact shoe 1 between tabs 24 and 25. In practice, a pair of pliers would be used to firmly grip threaded post 6 for inserting shoe 1.

With shield contact shoe 1 wedged between tabs 24 and 25 as shown in FIG. 4, it should be readily apparent that a substantial area of contact exists between the bottom surface of shielding 24 and the top surface of shield contact shoe 1. Thereafter, and as shown in FIG. 5, a roll of electrical tape 26 may be used to tape down tabs 24 and 25. Therefore, after tabs 24 and 25 are taped down, shield contact shoe 1 remains positioned between shielding 22 and binder 21 with post 6 extending from sheath 23. Anchor plate 2 is now positioned over threaded post 6 and rotated until aligned with shield contact shoe 1. Locking nut 3 is then threaded onto post 6 and securely tightened. Teeth 10 readily dig into sheath 23 and prevent anchor plate 2 from rotating while locking nut 3 is being tightened. As locking nut 3 is tightened, shield contact shoe 1 and anchor plate 2 are drawn together, thereby securing metal shielding 22 therebetween. Tab 11 is effective to provide an area of very tight contact between shoe 1 and plate 2. With locking nut 3 securely tightened, it should be readily apparent that there is good electrical continuity between shielding 22 and shield contact shoe 1. This electrical continuity extends from shoe 1 to threaded post 6, locking nut 3 and anchor plate 2. As a result, the entire bonding clip is positioned in electrical contact with shield 22.

Figure 6:
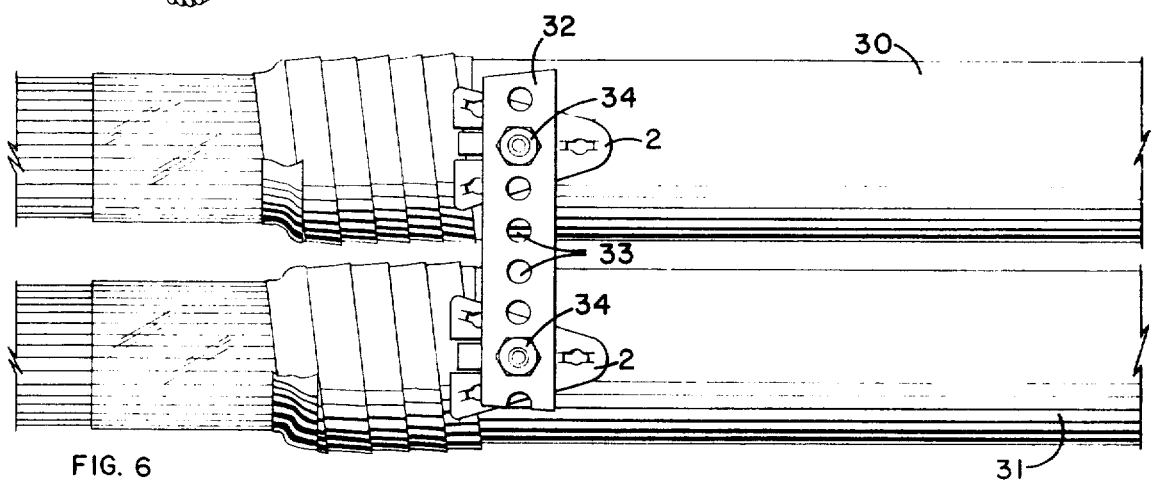
FIGS. 6, 7 and 8 show the manner in which the shielding of a plurality of cables may be bonded using the present invention.

After shield contact shoe 1 and anchor plate 2 are firmly secured, threaded post 6 provides a simple and efficient means for interconnecting several cables. Referring to FIG. 6, there is shown a situation where it is desired to bond first and second communications cables 30 and 31 positioned for a butt-end splice. To accomplish the bond, first and second bonding clips are attached to cables 30 and 31 in the manner described above. Thereafter, bonding of the shields of cables 30 and 31 is accomplished by means of a flat, elongated, metallic strip or bonding bar 32 having a plurality of holes 33 therein whose diameters are slightly greater than the diameter of threaded post 6 so that post 6 may be readily inserted therethrough. Bonding bar 32 may be provided in any convenient length and may be cut to the desired length in the field. In addition, bonding bar 32 is preferably a stiff, strong member so as to provide substantial mechanical strength to the bond. On the other hand, bonding bar 32 should be flexible so that it can be bent to any desired shape. In the case of a butt-end splice as shown in FIG. 2, a short piece of bonding bar 32 may be positioned between cables 30 and 31 so that the threaded post connected to cables 30 and 31 extend into different holes 33 of bar 32. After bonding bar 32 is positioned in place, a locking nut 34 may be threaded onto post 6 and securely tightened so that bonding bar 32 is tightly secured between nuts 3 and 34. The finished bond will appear as shown in FIG. 6. The electrical path between the shield of cable 30 and its threaded post 6 and the shield of cable 31 and its threaded post 6 is completed by bonding bar 32. In addition, because of the mechanical strength of bonding bar 32 and the rigid manner in which threaded post 6 is attached to each of cables 30 and 31, the present attachment operates as a mechanical anchor between cables 30 and 31.

Figure 7:
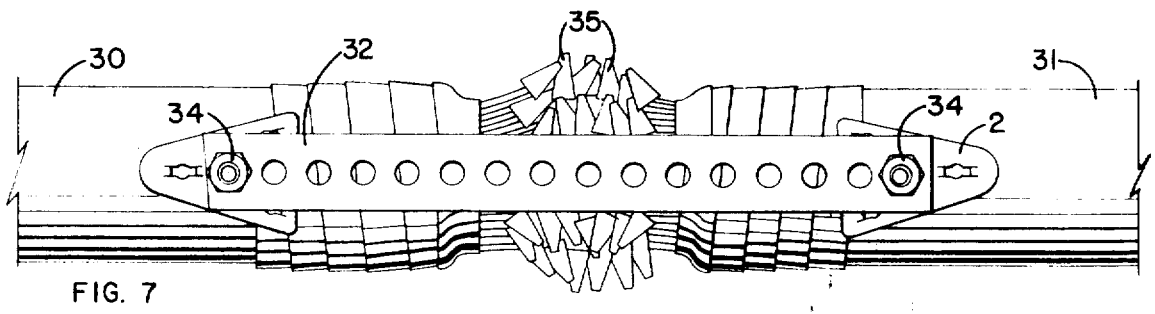

Referring to FIG. 7, the manner of effecting an in-line splice is shown. In this case, after the filaments of cables 30 and 31 are spliced to form a splice bundle 35, a bonding clip is attached to each cable and connection is made using a piece of bonding bar 32 and a pair of locking nuts 34.

Figure 8:
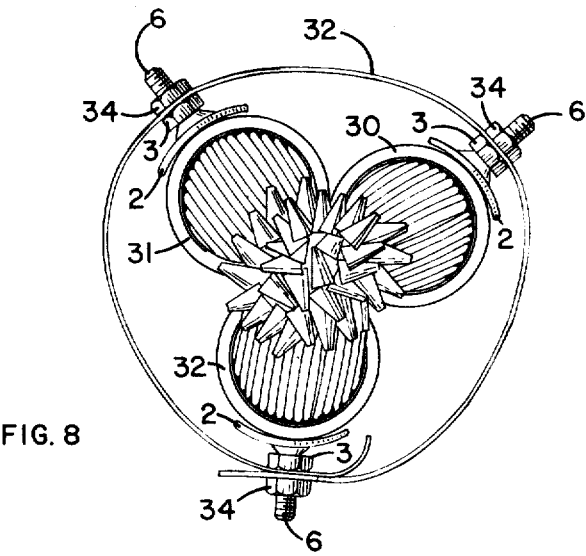

It should now be apparent that the present attachment is truly universal and may be used for bonding all sizes of shielded cables. Shield contact shoe 1, anchor plate 2 and locking nuts 3 and 34 all come in one size which may be used to bond cables of any diameter. Furthermore, because of the flexibility of bonding bar 32, the present bonding attachment is readily adaptable for bonding 2, 3 or more cables, plus all entering service wires. For example, as shown in FIG. 8, the present technique may be used for bonding three cables 30, 31 and 32 positioned for a butt-end splice. Bonding is achieved by simply securing a bonding clip to each of cables 30–32 so that the threaded posts 6 of each extend outwardly. After this is done, bonding bar 32 may be wrapped around the three cables and secured to each bonding clip as shown. The finished bond has not only the required electrical continuity between the shielding of each cable, but has high mechanical strength as explained above.

When bonding large cables, it may be found that a single bonding clip does not provide the required mechanical strength to the bond or it may be thought necessary to provide additional bonding clips to further insure good electrical continuity between the metal shielding of a plurality of cables. Where this is found desirable, after a first shield contact shoe 1 has been positioned as shown in FIG. 4, it may be desirable to insert a second shield contact shoe 1 but rotated through 180° so that the wide ends 4 of the two shoes are in contact. The procedure would then continue as before with the tabs taped down using standard electrical tape 26. However, after the bonding clips are inserted, there will be two points of connection to bonding bar 32 on each cable providing greater mechanical strength and greater electrical continuity.

Figure 9:
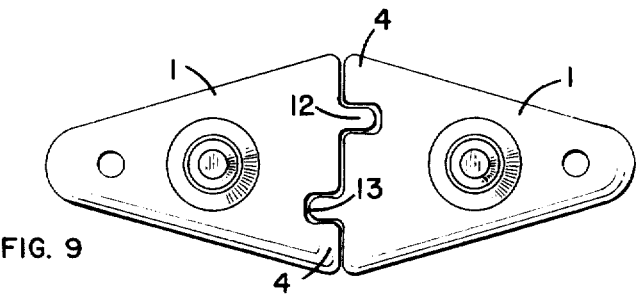
FIG. 9 shows a modification of the shield contact shoe of FIGS. 1 and 2 for use in bonding very large cables.

Referring to FIG. 9, in such cases it may be desirable to modify shield contact shoe 1 so that end 4 includes a tab 12 and a cutaway 13. Tab 12 and cutaway 13 should be equally spaced on opposite sides of the center line of shield contact shoe 1 so that when a second shield contact shoe 1 is rotated through 180°, the tab of one is aligned with the cutout of the other, as shown in FIG. 9. Such a configuration provides a locking action between the two shield contact shoes to prevent rotation thereof while locking nuts 3 are being tightened.

In the discussion of FIG. 3 above, it was mentioned that the plurality of filaments 20 of typical communications cables are often wrapped in a binder material 21. Where this is the case, the present bonding clip may effectively be used without modification. However, very often, the binder material is made integral with metallic shielding 22. In other words, the inner surface of shielding 22 is sometimes coated with a plastic-like material which functions in the same manner as binder 21. However, where this is the case, it will be readily apparent that if the present shield contact shoe 1 is positioned between shielding 22 and filaments 20 as described above in connection with FIGS. 3–5, the coating on the inner surface of shielding 22 will prevent electrical continuity between shield contact shoe 1 and shielding 22. This problem may be solved with aid of the apparatus of FIGS. 10 and 11.

Figure 10:
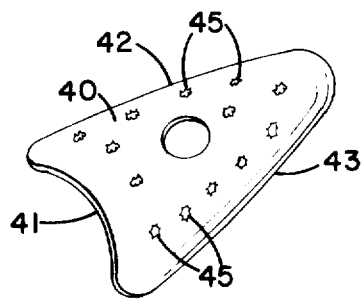
FIG. 10 shows a shim for use with the present bonding clip when the inner surface of the metal shielding is coated.
Figure 11:
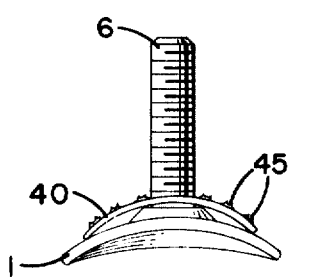
FIG. 11 shows the manner in which the shim of FIG. 10 is used with the remainder of the bonding clip.

Referring now to FIGS. 10 and 11, there is shown a shim 40 which is a generally wedge-shaped member whose shape is similar to that of shield contact shoe 1. However, as shown in FIG. 11, the radius of curvature of the wide end 41 of shim 40 is smaller than the radius of curvature of end 4 of shield contact shoe 1. For this reason, the opposite edges 42 and 43 of shim 40 contact the top surface of shoe 1 when shim 40 is placed over post 6, as shown in FIG. 11. The reason for this will be explained more fully hereinafter.

Shim 40 has a hole 44 therein in the approximate center thereof, the diameter of hole 44 being such that shim 40 may be readily placed over post 6, as shown in FIG. 11. Shim 40 further has a plurality of upwardly extending burrs which may be formed, most simply, by puncturing shim 40 from the bottom with a pointed instrument. The function of burrs 45 will become clearer hereinafter.

In operation, the procedure for using the combination bonding clip and shim is substantially the same as described above. AFter tabs 24 and 25 have been cut in shielding 22 and sheath 23, respectively, shim 40 is placed over post 6 and the narrow ends of each are forced into the space between tabs 24 and 25. With shield contact shoe 1 and shim 40 wedged between tabs 24 and 25, a roll of electrical tape 26 may be used to tape down tabs 24 and 25 as shown in FIG. 5. Anchor plate 2 is now positioned over threaded post 6 and rotated until aligned with shield contact shoe 1 and shim 40. Locking nut 3 is then threaded onto post 6 and securely tightened.

As locking nut 3 is tightened, thereby drawing shield contact shoe 1 and anchor plate 2 together, shim 40 is flattened to conform to the general curvature of shield contact shoe 1 and anchor plate 2. This change in shape of shim 40 causes burrs 45 to tear away at, scratch and penetrate the coating on the inner surface of metal shielding 22 and to dig into the shielding to assure good electrical contact between shim 40 and shielding 22. In this manner, an electrical path is provided from shielding 22 through shim 40 to shield contact shoe 1 and finally into threaded post 6.

Figure 12:
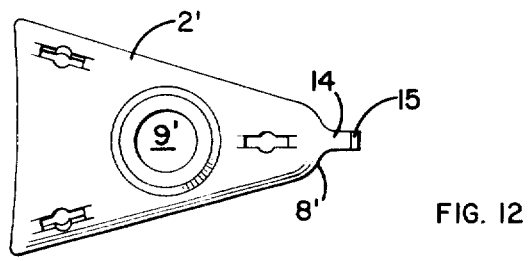
FIG. 12 is a top plan view of a modified form of anchor plate for use with the bonding clip of FIG. 1.
Figure 13:
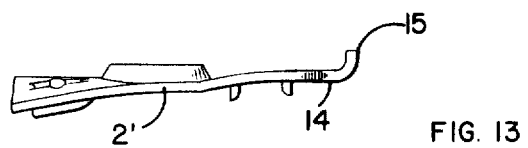
FIG. 13 is a side elevation view of the anchor plate of FIG. 12.

Referring now to FIGS. 12 and 13, there is shown an alternate embodiment of anchor plate 2. Anchor plate 2' is identical to anchor plate 2 except that there is included an extension 14 which may be made integral with the narrow end 8' of anchor plate 2', extension 14 terminating in an upwardly extending hook 15. Anchor plate 2' has a hole 9' in the approximate center thereof as was the case with plate 2. However, in the case of plate 2', the size of extension 14 is such that the distance between hook 15 and hole 9' is slightly greater than the width of the largest type of clamp used in securing shielded cables, for reasons which will become clearer hereinafter.

Figure 14:
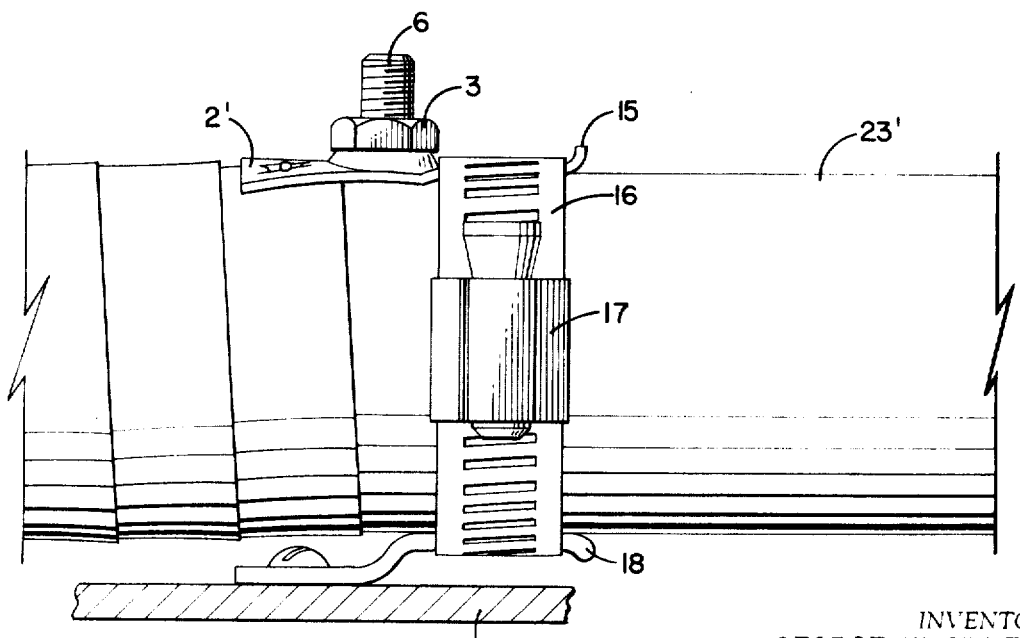
FIG. 14 is a side elevation view of a cable with the anchor plate of FIGS. 12 and 13 in place showing the present technique for grounding the cable shielding.

As stated previously, the shielding of telephone and electrical cables is generally grounded to protect the cable filaments in the presence of external electrical signals and to drain off induced currents generated by the electrical signals in the filaments. Referring now to FIG. 14, anchor plate 2' is ideally suited for achieving such grounding of a cable such as cable 23. More specifically, shield contact shoe 1, anchor plate 2' and locking nut 3 are first securely connected to cable 23 in the manner described above. Thereafter, a standard worm gear clamp 16, having a tightening mechanism 17, is positioned around cable 23 over anchor plate 2' between post 6 and hook 15. A grounding terminal 18, securely fastened to a ground source 19, is then positioned between clamp 16 and cable 23. Mechanism 17 is then rotated until clamp 16 is tightly secured around cable 23, anchor plate 2' and grounding terminal 18.

With clamp 16 in place, an electrical path is provided between the shielding of cable 23 and ground source 19 via shield contact shoe 1, post 6, nut 3, anchor plate 2', clamp 16 and terminal 18. Furthermore, hook 15 at the end of extension 14 prevents clamp 16 from slipping off anchor plate 2' which would result in removing the ground connection to cable 23.

While the invention has been described with respect to several embodiments constructed in accordance therewith, it will be apparent to those skilled in the art that various modifications and improvements may be made without departing from the scope and spirit of the invention. For example, whereas shield contact shoe 1, anchor plate 2 and shim 40 have been described as generally wedge-shaped members, it will be apparent to those skilled in the art that such shape is merely to facilitate the ready insertion of shield contact shoe 1 and that such shape is not absolutely necessary. Furthermore, whereas a separate shim 40 has been described for those situations where the inner surface of the metal shielding is coated, it will be apparent to those skilled in the art that shim 40 may be made integral with shield contact shoe 1 to provide a unitary structure rather than separate elements. Accordingly, the invention is not to be limited by the specific illustrative embodiments, but only by the scope of the appended claims.

We claim:

1. A universal attachment for bonding shielded cables enclosed in a sheath comprising: a first transversely curved conductive member adapted to be inserted beneath the shielding of said cable and having a post fixed thereto and adapted to extend outwardly through the cable sheath; a separate similarly transversely curved second conductive member having a hole therein adapted to be positioned over said post from the exterior side of the cable sheath; and means adapted to be placed on said post for tightly compressing said shielding and said sheath between substantially the entire juxtaposed curved surfaces of said first and second members whereby said first member is in electrical contact with said shielding and whereby said shielding and said sheath are firmly clamped together between said first and second members substantially throughout their juxtaposed surface areas to provide a high strength electrical and mechanical connection with a cable shield and sheath.

2. A universal attachment as defined in claim 1 wherein said second member further comprises: a plurality of sharp burrs extending inwardly from the curved inner surface thereof effective to dig into said plastiC sheath to prevent rotation of said second member while said locking nut is being tightened.

3. A universal attachment as defined in claim 1 wherein said second member further comprises: a hook shaped extension positioned adjacent one end of said second conductive member and extending away from said cable when said member is secured thereto and having a radial height effective to hold captive a clamp positioned around said cable over said second member so as to be held captive between said post and said extension.

4. A universal attachment as defined in claim 1 characterized in the provision of a third member of conductive material having a plurality of pointed burrs extending from one face thereof and adapted to be positioned between the inner surface of the cable shielding and said first member effective to dig into the inwardly facing surface of said shielding to assure electrical continuity between said shielding and said first member even through said inner surface is coated with a non-conductive film.

5. A universal attachment as defined in claim 1 further comprising: a third member of conductive material having a hole therein adapted to be positioned over said post and inserted beneath said shielding of said cable with said first member, said third member having a plurality of pointed burrs extending from the side thereof in contact with said shielding effective to dig into said shielding through any non-conductive film thereon to assure electrical continuity between said shielding and said first member.

6. A universal attachment as defined in claim 1 characterized in that said first member includes means supported thereby and facing toward said second member and having a plurality of sharp low-height burrs projecting toward said second member and toward the adjacent side of a cable shielding jacket effective to dig into the shielding jacket and make excellent electrical contact therewith as said first and second members are compressed toward one another from the remote sides of a cable sheath and shielding jacket.

7. A universal attachment for bonding shielded cables according to claim 1 wherein said post is threaded and wherein said means placed on said post for compressing said shielding and said sheath comprises a locking nut.

8. A universal attachment for bonding shielded cables according to claim 7 further comprising: a flat, elongated strip of conductive material having a plurality of holes therein, said threaded post adapted to be extended into one of said holes; and a further locking nut adapted to be placed on said post and tightened to secure said strip between said nuts, whereby a second threaded post attached to a second shielded cable may be extended into another of said holes in said strip and secured thereto to bond the shielding of said cables.

9. A universal attachment for bonding shielded cables according to claim 1 wherein said first member comprises: a generally wedge-shaped member curved to approximate the curvature of the shielded cable.

10. A universal attachment as defined in claim 9 in combination with a shielded cable having a plastic enclosing sheath, said sheath and said shielding having three longitudinal cuts extending lengthwise of said cable to form a pair of elongated tabs thereby to facilitate entry of said wedge-shaped member beneath said shielding with said post extending outwardly between the tabs to either side of the middle one of said cuts, said tabs being taped down by servings of adhesively coated tape to secure said first and second members in place.

11. A universal attachment as defined in claim 9 wherein said second member further comprises: a plurality of sharp burrs extending from one side thereof effective to dig into said cable sheath to prevent rotation of said second member while said locking nut is being tightened.

12. A universal attachment as defined in claim 9 wherein said wide end of said first member has a tab extending therefrom and a cut-out extending therein, said tab and said cut-out being equally spaced on opposite sides of the center line of said first member, the width of said cut-out being slightly greater than the width of said tab.

13. A universal attachment as defined in claim 9 wherein said second member comprises: a generally wedge-shaped member whose shape is substantially the same as that of said first member, the wide end of said second member being curved similarly to the curvature of said first member.

14. A universal attachment for bonding shielded cables as defined in claim 13 wherein said second member further comprises: a hook shaped extension projecting outwardly from one end of said second wedge shaped member and spaced from said post sufficiently to accommodate a clamping band, and said hook shaped extension being effective to retain a clamping band in place about said wedge-shaped member and a shielded cable to which the same is assembled.

15. A universal attachment as defined in claim 13 further comprising: a third member of relatively thin resilient conductive material having a hole therein adapted to be positioned over said post and inserted beneath said shielding of said cable with said first member, said third member having a plurality of sharp pointed burrs extending from the side thereof in contact with said shielding effective to dig into said shielding through any non-conductive film thereon to assure electrical continuity between said shielding and said first member.

16. A universal attachment for bonding shielded cables as defined in claim 15 wherein the radius of curvature of said third member is smaller than that of said first member whereby the flattening of said third member as said attachment is clamped in assembled position causes said burrs to scratch and gouge through any non-conductive film sometimes present into good electrical contact with the cable shielding.

17. A universal attachment as defined in claim 1 wherein said second member further comprises: an outwardly extending hook at one end thereof for preventing slippage of a clamp wrapped around said cable and over said second member in the portion thereof between said post and said hook.

18. That method defined in claim 17 characterized in providing the underside of said anchor plate with short sharp teeth, and causing said teeth to penetrate into the cable sheath as said retainer is tightened thereby to restrain said anchor plate from rotating.

19. That method of making a solderless electrical connection to a thin metal shielding jacket snugly embraced by an insulative cable sheath which comprises: slitting the shielding jacket and sheath for a short distance generally lengthwise of the cable, forming a separate passage through said shielding jacket and sheath offset circumferentially from said slit, inserting a shank through said passage from the inner end thereof and having a wide area curved metallic shoe means conforming generally to the cylindrical contour of said cable and rigidly attached centrally thereof to one end of said shank, reclosing the expanded shielding jacket and sheath against the cable conductors, placing a perforated anchor plate curved similarly to said shoe means over the outer end of said shank and having a juxtaposed surface area substantially coextensive with said shoe means, and assembling a retainer over the outer end of said shank to clamp said shield jacket and cable sheath tightly together between the similarly curved surfaces of said metallic shoe means and said anchor plate with the outer end of said shank and said anchor plate available for connection to an electrical conductor.

20. That method defined in claim 19 characterized in the step of wrapping said cable sheath with a plurality of convolutions of tensioned tape throughout the length and beyond the ends of said slit to bind said sheath firmly compressed against the underlying portion of the cable and to hold said slit closed.

21. That method defined in claim 20 characterized in the step of applying said anchor plate over said shank after wrapping the sheath with said convolutions of tape.

22. That method defined in claim 21 characterized in the step of applying a metallic clamping band about said cable and the exposed outer surface of said anchor plate and tightening said clamp to further increase the anchorage of said shoe means, shank and anchor plate to the cable and to safeguard against the risk of damage to the electrical connection with said thin metal shielding.

23. That method defined in claim 19 characterized in the step of encircling the slit portion of the cable sheath with snug banding cooperating with said anchor plate and retainer to hold the slit end of the cable sheath compressed and pressed snugly about the cable.

24. That method defined in claim 23 characterized in the step of using electrically conductive material to encircle said cable sheath and tensioning the same about the cable with a portion thereof overlying and in pressure contact with said anchor plate.

25. That method defined in claim 19 characterized in providing the side of said metallic shoe means adjacent the interior face of the metallic shield with a multiplicity of sharp burr-like protrusions capable of biting into and making good electrical contact with the shielding as said retainer is tightened thereby to augment assurance of excellent electrical contact with the cable shielding.

26. That method defined in claim 25 characterized in the step of utilizing metallic shoe means adjacent the interior face of the metallic shield which includes an innermost rigid wide-area metallic shoe means and a relative thin initially arched metallic plate having said multiplicity of said sharp burr-like protrusions projecting therefrom and adapted to scratch and penetrate into said overlying metallic shielding jacket as said metallic shoe means and said anchor plate are compressed toward one another from the remote sides of a cable sheath and its shielding jacket.

27. That method defined in claim 19 characterized in the steps of utilizing metallic shoe means which is substantially longer than the width thereof and curved crosswise of its width to conform to the cable contour, and utilizing the longer opposite ends of said shoe means to engage said thin shield and the cable sheath to resist rotation of the shank as the retainer is being tightened.

28. That method defined in claim 27 characterized in that one of the longer ends of said shoe means is relatively narrow, and inserting said narrow end of said shoe means first between the out-turned edges of the slit shielding and cable sheath.

29. That method defined in claim 27 characterized in the steps of utilizing an elongated anchor plate curved cross-wise thereof and generally complementally to the curvature of said shoe means and of said cable sheath, and applying tensioned band means about the exterior of said cable sheath with a portion thereof embracing one longer end of said anchor plate to clamp the same firmly in place over said slit and against the cable sheath.

30. A solderless connector assembly for use in making a high strength electrical connection to a thin and frail layer of metallic shield embracing a bundle of electrical conductors beneath a thick walled snug-fitting sheath, said connector assembly comprising an elongated metal shoe curved crosswise thereof and having a threaded shank mounted to and projecting from the mid length thereof, a generally complementary curved clamping plate having a central hole fitting loosely over said shank, a metallic shim arched crosswise thereof on a shorter radius than said shoe and formed with a multiplicity of sharp burrs on the face thereof facing said shielding layer, said elongated shoe, shank and shim assembled over said shank being insertable through registering passages extending through the shielding layer and sheath of a cable of conductors with the shank projecting outwardly through said registering passages, said clamping plate being assembled over the shank on the exterior side of said sheath, and a clamping nut on said shank wrenchable to clamp said conductor assembly tight with said metal shoe and said clamping washer holding said shielding layer and sheath clamped together therebetween with the inner surface of said shield layer in solderless conductive contact with said metallic shoe with said shim having a central opening for loose reception of said shank, said burrs biting into and making positive electrical contact with the shielding layer as said clamping nut is tightened thereby flattening the arch in said shim, and said elongated shoe being held against rotation but abutment with the adjacent curved walls of said sheath while said clamping nut is being tightened.

31. A solderless connector assembly as defined in claim 30 characterized in that said clamping plate is elongated and curved crosswise thereof in general conformity with the curvature of the cable sheath.

32. A solderless connector assembly as defined in claim 30 characterized in that one end of said shoe is relatively narrow and pointed for use as a pilot while inserting said shoe lengthwise of the entrance end of said slits in the shielding layer and sheath.

33. A solderless connector assembly as defined in claim 32 characterized in that the inner surface of said clamping plate has at least one tooth adapted to penetrate into said sheath during tightening of said clamping washer to prevent the latter from rotating relative to the axis of said shank.

34. A universal attachment for bonding shielded cables enclosed in a tubular sheath comprising: electrical bonding means including an inner metallic member having a plurality of sharp pointed burrs protruding from the surface thereof and adapted to penetrate a film of non-conductive material and into electrical contact with the cable shield when compressed thereagainst, the burr-carrying portion of said inner metallic member being flexible and shaped to be deformed while being compressed against the inner surface of a cable shield thereby causing said pointed burrs to gouge and penetrate through any protective film present on the inner surface of the shield and to make pressurized electrical contact with the cable shield, and mechanical clamping means for applying pressure between said metallic member and the adjacent surface of the cable shield to force the same into high pressure contact with one another.

35. A universal attachment as defined in claim 34 characterized in that said mechanical clamping means includes manually adjustable split ring clamping band means adapted to encircle the exterior of a cable in an area overlying said inner metallic member and effective as said band is tightened to compress the cable while compressing said metallic member against the interior surface of the cable shield thereby to provide a high strength mechanical and electrical connection to the cable shield.

36. A universal attachment as defined in claim 34 characterized in that said electrical bonding means includes inner and outer metallic portions electrically interconnected to one another when assembled astride the end of a cable shield and an encircling cable sheath, at least said inner portion having sharp pointed burr means positioned to penetrate the inner surface of the cable sheath, and manually adjustable clamping band means adapted to embrace the cable outwardly of and in contact with said outer metallic portion and effective when tightened to compress said cable shield and sheath between said inner and outer metallic portions to provide a high strength mechanical assembly and an excellent electrical connection between the cable shield and said electrical bonding means.

37. A universal attachment as defined in claim 34 characterized in that said metallic member is insertable beneath the cable shield in a direction axially of the cable, and said mechanical clamping means including means operable from the exterior side of the cable sheath.

38. A universal attachment as defined in claim 37 characterized in that said mechanical clamping means is operable to clamp the cable sheath against the cable shield and said metallic member in a manner to maintain said sharp pointed burrs in high pressure electrical contact with the shield and in a manner to utilize the strength of the cable sheath to reinforce the anchorage of said metallic member to the shield.

39. A universal attachment as defined in claim 38 characterized in that said mechanical clamping means includes means for anchoring a conductor in electrical circuit with said metallic member.

40. An article of manufacture comprising a thin, resilient flexible metal plaque useful in making good electrical contact with the inwardly-facing insulation-coated surface of the electrical shielding jacket of an electrical cable, said metal plaque having a plurality of low-height sharp pointed burrs struck outwardly from areas within the periphery thereof for a distance in excess of the thickness of the insulation coating on a cable shielding jacket and effective to penetrate and scratch the same and make positive electrical contact with the metal shield as the shield is compressed against the burrs of said plaque as an incident to being sandwiched under radial compressive forces between cable conductors and the cable shielding jacket.

41. An article of manufacture as defined in claim 40 characterized in that said plaque is arched to a curvature of shorter radius than the radius of the shielding jacket with which the same is to be used, said sharp pointed burrs projecting outwardly from the exterior surface of said arched plaque and effective to form short scratches in the insulation coating on a shielding jacket as said plaque is being flattened and compressed into conformity with the surface of a cable shielding jacket of longer radius.

42. An article of manufacture as defined in claim 41 characterized in the provision of pressure shoe means adapted to be placed against the exterior surface of a cable sheath opposite said plaque, said pressure shoe means being wider at one end than at the other and having a long-height outwardly projecting tang at one end thereof, and an adjustable clamping band adapted to be assembled about the cable and embracing said pressure shoe means in an area located between the wider end thereof and said tang and effective when tightened to apply pressure to hold the cable shield jacket compressed against the sharp pointed burrs of said plaque.

43. A cable shield jacket grounding assembly for use in grounding a cable shield jacket and in anchoring the cable to a fixed support therefor, said assembly comprising a metal shank having a large area thin head at one end and which shank is adapted to be assembled through a cable sheath and shield jacket from the interior side of said shield jacket, clamping shoe means thereafter installable over the outer end of said shank, said clamping shoe means having a low-height outturned tang at one end thereof, and clamping band means installable about the cable and about said shoe means between said shank and said tang and effective when tightened to hold said shield jacket and cable sheath tightly clamped between the thin head of said shank and said shoe means to provide a grounding contact between said shielding jacket and the thin head of said shank.

44. The grounding assembly defined in claim 43 characterized in the provision of an elongated metallic grounding terminal and cable anchorage, said grounding terminal being insertable between the exterior of a cable sheath and said clamping band before the latter is tightened and having an end projecting beyond one lateral edge of said band and securable to a fixed rigid grounding conductor.

45. The grounding assembly as defined in claim 43 characterized in that said shank is threaded, and nut means assembled over the outer end thereof for supplementing said clamping band in holding said shoe means clamped under pressure against the exterior of a cable sheath.

46. The grounding assembly as defined in claim 45 characterized in the provision of a metallic shim assembled over said shank between the thin head thereof and the inner surface of said shield jacket and having a multiplicity of sharp pointed burrs facing said shield jacket and adapted to penetrate into said jacket as the jacket and said shim are pressed firmly against one another.

47. An article of manufacture comprising an electrical connector useful in making good electrical contact with a thin metallic electrical conductor in an area coated with a layer of non-conductive material, said electrical connector being arched with only a portion thereof initially in contact with a thin conductor, a multiplicity of low-height sharp pointed burrs protruding outwardly from the face of said arched connector and effective to make short fully-penetrating scratches through a non-conductive coating thereon as said arched connector is compressed and flattened thereagainst thereby to provide highly effective electrical contact between said connector and said conductor so long as the same are held in contact with one another.

48. An article of manufacturing as defined in claim 47 characterized in that said connector is made of relatively stiff resilient material whereby said sharp pointed burrs tend to make scratches again upon any relaxation of pressure on said connector and upon any arching recovery movement thereof.

49. An article of manufacture as defined in claim 48 characterized in the provision of an opening through the arched area of said connector adapted to receive an assembly fastener useful in applying compressive pressure to said arched connector.

50. An article of manufacture as defined in claim 47 characterized in the provision of clamping means including a plurality of pressure pad means and means for holding said pressure pad means pressed toward one another from opposite the remotely located faces of said pressure pad means while said connector and said conductor are sandwiched between said pressure pad means.

51. An article of manufacture as defined in claim 50 characterized in that said means for holding said pressure pad means pressed toward one another comprises bolt means.

52. An article of manufacture as defined in claim 51 characterized in that said bolt means extends through openings in said connector and at least one of said pressure pad means.

53. An article of manufacture as defined in claim 51 characterized in that said bolt means comprises part of an electrically conductive path between said metallic conductor and a second conductor anchorable to said bolt means.

54. A solderless connector assembly for use in making a strong mechanical and electrical connection to a thin and frail metallic shield embracing a bundle of electrical conductors and underlying a thick tough cable sheath, said solderless connector assembly comprising a threaded shank projecting outwardly through an elongated transversely-arched wide-area inner metallic shoe the advance end of which is insertable lengthwise of the cable beneath and in contact with the inner surface of said metallic cable shield, an elongated wide-area rigid metallic clamping shoe transversely arched complementally to said inner shoe having a hole fitting loosely over the outer end of said threaded shank, the large area transversely arched adjacent surfaces of said inner shoe and of said clamping shoe being juxtaposed to one another substantially throughout the area of one thereof, and nut means on said threaded shank adapted to be tightened to force said shoes toward each other to compress said shield and sheath together between the transversely arched juxtaposed surfaces of said inner shoe and said clamping shoe thereby to provide wide area electrical contact between said shield and said inner shoe and utilizing the strength of said cable sheath to provide a strong mechanical anchorage for said solderless connector assembly to said cable and to the metallic shield thereof.

55. A solderless connector assembly as defined in claim 54 characterized in that the end of said inner shoe serves as a pilot and is insertable first beneath the metallic shield of the cable and lengthwise of the cable and can the shield and sheath outwardly to make room for the advancing shoe.

56. A solderless connector assembly as defined in claim 54 characterized in the provision of adjustable clamping band means assembled about the cable in an area closely beside said threaded shank and embracing the adjacent ends of said inner shoe and of said clamping shoe and effective as said band is tightened to utilize the adjacent portion of the cable to assure good electrical contact with the cable shield and to strengthen the mechanical anchorage of the solderless connector assembly to the cable.

57. In combination, a multiple conductor cable of the type having a thin metal shield underlying a thick tough elastomeric sheath, a solderless connector assembly rigidly clamped to said shield and sheath in a manner making highly advantageous use of the strength of said tough sheath as an anchorage for a grounding conductor to said metal shield, said connector assembly comprising inner and outer elongated rigid metal shoes having large area juxtaposed surfaces shaped complementally to one another substantially throughout said juxtaposed surfaces, said inner shoe being inserted endwise and lengthwise of said cable with one entire face thereof pressed against the inner surface of said metal shield and having a shank projecting outwardly therefrom, said outer shoe having a hole therethrough and assembled over said shank and having substantially one entire surface lying against the exterior of said tough sheath in an area opposite said inner shoe, keeper means on said shank tightened against said outer shoe to clamp said shield and sheath together between said large area complementally shaped adjacent faces of said inner and outer shoes with said inner shoe in pressurized electrical contact with the inner surface of said inner shoe and with said shield clamped in pressure contact with a large area of said tough sheath thereby to provide a strong mechanical anchorage between said solderless connector and said sheath and the conductors enclosed thereby, and said shank providing means for clamping thereto a grounding conductor for the cable shield.

* * * * *